United States Patent
van Cruyningen

Patent Number: 5,805,167
Date of Patent: Sep. 8, 1998

[54] POPUP MENUS WITH DIRECTIONAL GESTURES

[76] Inventor: Izak van Cruyningen, 254B College Ave., Palo Alto, Calif. 94306-1511

[21] Appl. No.: 739,611

[22] Filed: Oct. 30, 1996

Related U.S. Application Data

[63] Continuation of Ser. No. 310,838, Sep. 22, 1994, abandoned.

[51] Int. Cl.[6] ...................................................... G06F 3/00
[52] U.S. Cl. ........................... 345/353; 345/347; 345/358
[58] Field of Search ..................... 395/353, 352, 395/354, 347, 358, 355, 339, 348, 976, 341, 135, 349; 345/113, 145, 146, 353, 352, 354, 347, 358, 355, 339, 348, 349, 976, 341, 435

[56] References Cited

U.S. PATENT DOCUMENTS

| | | | |
|---|---|---|---|
| 4,692,858 | 9/1987 | Redford et al. | 345/333 |
| 4,896,291 | 1/1990 | Gest et al. | 345/353 |
| 4,931,783 | 6/1990 | Atkinson | 345/163 |
| 5,157,384 | 10/1992 | Greanias et al. | 345/156 |
| 5,189,633 | 2/1993 | Bonadio | 364/709.12 |
| 5,230,063 | 7/1993 | Hoeber et al. | 345/354 |
| 5,231,698 | 7/1993 | Focier | 707/541 |
| 5,237,653 | 8/1993 | Noguchi et al. | 345/345 |
| 5,241,655 | 8/1993 | Mineki et al. | 345/354 |
| 5,276,794 | 1/1994 | Lamb | 707/507 |
| 5,303,388 | 4/1994 | Kreitman et al. | 345/348 |
| 5,317,687 | 5/1994 | Torres | 345/349 |
| 5,345,550 | 9/1994 | Bloomfield | 345/353 |
| 5,425,140 | 6/1995 | Bloomfield et al. | 345/353 |
| 5,452,414 | 9/1995 | Rosendahl et al. | 345/355 |
| 5,475,810 | 12/1995 | Sasaki et al. | 345/352 |
| 5,500,935 | 3/1996 | Moran et al. | 345/358 |
| 5,500,936 | 3/1996 | Allen et al. | 345/348 |
| 5,528,735 | 6/1996 | Strasnick et al. | 345/427 |
| 5,664,133 | 9/1997 | Malamud et al. | 345/352 |

OTHER PUBLICATIONS

Rubine, "Specifying Gestures by Example," ACM Computer Graphics, vol. 25, No. 4, Jul. 1991, pp. 329–337.
Kurtenbach et al., "Issues in Combining Marking & Direct Manipulation Techniques," UIST '91, pp. 137–144.
Bier et al., "Toolglass & Magic Lenses: The See–Through Interface," SIGGRAPH '93, pp. 73–80.
Cowart, Mastering Windows™3.1, Special Edition, Sybex Inc., 1993, pp. 22–24.
VisualTablet brochure by ZMC. 4 pages, 1993.
Command View User's Guide, Control Systems, Jun., 1993.
Pixie—A New Approach to Graphical Man–Machine Communication N.E. Wiseman, H.U. Lemke, J.O. Hiles Proc. 1969 CAD Conf. Southhampton, IEE, 51, pp. 463–471.
Directional Selection is Easy as Pie Menus D. Hopkins, Fourth USENIX Computer Graphics Workshop, 1987.
Designing the Star User Interface D.C. Smith, C. Irby, R. Kimball, W. Verplank, E. Harslem BYTE, v. 7, N. 4, 1982, pp. 653–661.

(List continued on next page.)

Primary Examiner—Matthew M. Kim
Assistant Examiner—Crescelle N. dela Torre

[57] ABSTRACT

A method and apparatus for using directional gestures in popup menus to enter data into and control a computer system. A popup menu contains a number of items represented by images or labels positioned on a regular grid around a popup position. When an operator requests a popup menu using a trigger event, the appropriate menu for the operator, the trigger, and the system state is selected and is displayed with the popup position centered over the current cursor position. The operator scans through the items by dragging the cursor and selects one to initiate the associated action. The operator can design menus containing the commands he or she uses most frequently and use these menus with existing applications without revising the applications. Menus with many items are managed by scrolling or by progressive disclosure of the menu items.

11 Claims, 9 Drawing Sheets

OTHER PUBLICATIONS

An Empirical Comparison of Pie vs. Linear Menus J. Callahan, D. Hopkins, M. Weiser, B. Shneiderman CHI '88 Proc. pp. 95–100, 1988.

"Are All Menus the Same?" Z. Mills, M. Prime, Interact '90 ed. D. Diaper et. al. Elsevier Science Publ. B.V. IFIP, 1990, pp. 423–427.

"The Design and Implementation of Pie Menus" D. Hopkins Dr. Dobb's Journal, Dec. 1991, pp. 16–26.

"Pie Menus for Windows" C. Rollo, Dr. Dobb's Journal, Nov. 1992, pp. 30–35.

"The Design and Evaluation of Marking Menus" G. Kurtenbach Thesis for the University of Toronto 1993.

POPUP MENUS WITH DIRECTIONAL GESTURES

This is a continuation of application Ser. No. 08/310,838, filed Sep. 22, 1994, now abandoned.

BACKGROUND OF THE INVENTION

1. Field of Invention

This invention relates to menu systems used for controlling, and entering input data into, digital computer systems.

2. Description of Prior Art

FIG. 1 is an illustration of a computer system. Data and programs are stored in a memory store 44. Using an input device such as a mouse 42 or keyboard 43, an operator enters either data which is added to the memory store 44, or commands to control which program fragments are executed on a processing unit 41. The results of processing are presented on a display 40. Examples of computer systems include personal computers to assist in office automation, pen-based computers which emulate a notepad, or computer systems embedded in printers, facsimile machines, cars, televisions, etc. to provide more flexible features and control for the operator.

As computer systems become more prevalent, they are being used by operators who receive little prior training. Ease of learning in the human computer interface is critical. In the late 1970s, researchers at Xerox PARC (Smith et al. 1982) developed an innovative interface and formulated a number of design guidelines to improve ease of learning.

One important guideline is to emphasize recognition, rather than recall, in the interface. Rather than requiring the operator to remember the name and syntax of a command, the interface should present a list of items from which the operator can choose. This guideline lead to the development of menubars with pull-down menus common in graphical user interfaces used on many computer systems.

Menubars greatly simplify learning because all the available commands can be accessed directly by pulling down different menus from the menubar. However, they are slow and frustrating for expert operators. Moving the cursor up to the menubar and pulling down the appropriate menu seems painfully slow for familiar, oft used, commands. Ease of learning does not translate directly into ease of use. Keyboard shortcuts (accelerators) and access keys (mnemonics) provide alternative routes to choosing items from the menus. These routes use recall, rather than recognition, which means they require more training. Unfortunately different applications use the same keystrokes for different commands which causes operator confusion and hesitance in trying the shortcuts.

Removable menus (U.S. Pat. No. 4,931,783 to W. D. Atkinson), pin-up menus (U.S. Pat. No. 5,230,063 to A. Hoeber, A. Mandler, and N. Cox), toolbars, and toolboxes provide different means to make specific menu items visible at all times. They all allow the operator to bring the menu closer to the work area or to move it if it obscures part of the area of interest. They improve access to specific menu items at the expense of covering a portion of the work area.

Popup menus avoid covering up part of the work area. These menus have the added advantage of bringing the menu to the cursor, rather than having to move the cursor to the menu. When a trigger event occurs, for example pressing the right button on the mouse, a window is displayed next to the cursor position. Frequently used commands, or commands relevant to the work area under the cursor, are listed as menu items in the window to create a linear menu. The window is displayed to the right and extends down from the current cursor position. The initial cursor position is outside the window to avoid accidental item selections. When the operator chooses a menu item, the window is removed and the action corresponding to the item is initiated. To ensure rapid, accurate selection these menus are generally limited to 8–10 items without any submenus.

Pie menus enhance popup menus by allowing directional selection to choose items. A pie menu is like a popup menu, but the pie-shaped menu items surround the cursor position in a circle. The cursor is moved in a specific direction to select one of the items. Moving the cursor in a particular direction is easier and quicker than positioning it on a specific item in a vertical list of items. Experimental tests by Callahan et al. and by Mills and Prime have shown pie menus have lower seek times and much lower error rates than linear menus.

Furthermore, as operators gain experience with a particular pie menu layout, they begin to choose items through directional gestures without even looking at the individual items. This provides the rapid selection advantages of short-cut keys to an operator using a pointing input device such as a mouse or pen. Each use of a pie menu reinforces the directional selection motion for the operator. After extended use, menu selection may become a motor skill or reflexive action for the operator which may be even faster than remembering the appropriate keyboard shortcut for a command.

Pen-based computers also use gestures for input and control, but these gestures are more complex. Data entry gestures commonly require a recognition system to convert the drawn symbol into a useful computer representation. Command and control gestures commonly simulate proof-reading symbols or require drawing a letter followed by a circle. They also require a recognition system. To avoid confusion we will denote these as symbolic gestures, as opposed to directional gestures. Symbolic gestures use recall, rather than recognition. The operator has to be trained to remember which gestures are available. In contrast, using a two-dimensional menu with directional gestures only requires that the operator remember the initial trigger event to display the menu. Thereafter the menu displays the items for quick learning. The self-reinforcement of directional gestures allows a smooth transition to expert use whereas symbolic gestures have to be learned and practiced before they can be used.

In spite of the cited advantages of pie menus, after eight years of study they have remained almost entirely an academic invention. The circular symmetry of pie menus is very appealing from aesthetic and theoretical viewpoints. Researchers consider equal sector angles and equal radii for menu items important for equalizing the ease of selection for all items. However the pie menus described in the prior art have significant practical problems:

a) They require a large amount of screen space which covers up too much of the work area and may not fit on a small display. Covering up the workspace obscures the operator's focus of attention and requires a great deal more repainting of the workspace when the menu is removed.

b) They are a poor fit with the rectangular windows and bitmaps used in popular graphical user interfaces so they are inefficient and difficult to implement.

c) To ensure reliable selection they are limited to 12 items per menu. Submenus can be used to access additional items, but selecting an item in a submenu is slower than selecting one on a primary menu. A 'dartboard' layout with additional annular rings has been proposed, but takes up even more space.

d) They require revision of an application, "for best results, the application's menu items should be arranged with a circular layout in mind" (Hopkins, 1991).

e) They have been implemented in specific applications, rather than being available in all applications in a system. This produces similar problems as having different keyboard shortcuts for different applications. Operator experience with different applications does not accumulate and may well interfere destructively.

The individual operator is probably best suited to assessing his or her own needs, yet is least likely to be able or interested in undertaking extensive revisions in application or system programming. It would be advantageous to allow the individual operator to design popup menus, and thereby choose directional gestures, for the actions or data entry sequences he or she uses most frequently.

SUMMARY OF THE INVENTION

It is an object of the invention to allow directional gestures in efficient popup menus for control and data entry in a computer system.

It is another object of the invention to allow directional gestures in one or more efficient popup menus for an application program in a computer system without requiring revision of the application program, even if the application program was not designed to support this type of menu.

It is still another object of the invention to allow a relatively unsophisticated operator to design such popup menus for the applications in her or his system to create directional gestures and menus appropriate to her or his individual needs.

It is yet another object of the invention to allow different operators working on the same computer or on the same network of computers to design and use popup menu descriptions for the applications on the system and restrict use of the menu descriptions to private, group, or public accesses and to preserve separate preferences for each individual operator.

It is yet still another object of this invention to automatically choose the appropriate popup menu depending on the operator requesting the menu, the currently active application, the menu triggering event, and state for a computer system or network.

It is a further object of this invention to provide a default popup menu definition that provides quick access to the most frequently used commands common to many applications and can be updated, displayed, and used with an application in the system without requiring the operator to have designed a menu description for the application.

These and other objects are accomplished by this invention in which an operator can control and enter data into a computer system using directional gestures in popup menus containing items in a regular grid. In the preferred embodiment described in detail below, an operator requests the display of a popup menu using a trigger event. The operator's user id, the active application, the trigger event, and additional system state are used to automatically choose an appropriate popup menu definition. The popup menu is displayed with the popup position centered over the current cursor position. The menu is drawn with rectangular images positioned on a rectangular grid surrounding the popup position. The operator can then use a directional gesture to select one of the menu items. When the operator confirms the selection, the action corresponding to that menu item is initiated.

If the active application at the time of the trigger event does not have a corresponding menu description, a default menu definition is automatically updated for the active application and is displayed for use. If the application will be used frequently, the operator has the option of designing a new menu description for that application. The new menu description can be placed anywhere in a range or hierarchy of access rights so it is made available only for personal use (private), available to any member of a group of operators (group access), or be available to all operators on the system (public access).

Some additional advantages of the invention include:

a) Menus containing items positioned on a rectangular grid are more compact than pie or dartboard arrangements so they don't obscure as much of the workspace, fit on smaller displays, require smaller gestures, produce less of a visual interruption for the operator, and require less drawing on both pop up and pop down. Rectangular items fit text and commonly used icons very closely, so there is little wasted space. In pie or dartboard menus screen space is wasted both in the corners of the angular menu items and in the corners of the rectangular window surrounding the entire circular menu.

b) Rectangles are easier to implement and require less processing time during display or gesture tracking. Painting a pie or angular shape on the display can take an order of magnitude longer than filling a rectangle of equal area. Indeed, when filling more than one irregular (e.g. pie) shape of the same size it is usually more efficient to produce a rectangular mask that encloses the shape and to paint rectangles through this mask.

An algorithm named hit-detection is used to determine which item is under the cursor when tracking a directional gesture. Testing if the cursor is inside a rectangle involves four inexpensive comparisons with the positions of the four sides. Hit-detection in a pie shape requires two radii and two angle calculations, as well as the comparisons.

c) Pie menus are generally limited to 12 items to ensure rapid, accurate selections. Dartboard menus can provide additional items, but the menus become very large and are expensive to implement. Rectangular grids pack the images for the menu items very closely, so more items can be placed on a menu without making it unwieldy.

d) The prior art has emphasized equal sector angles for the items in pie menu to ensure equal ease of selection. In a rectangular grid layout, the corner items subtend a smaller sector angle than the north, south, east, or west items. Initially this may appear to be a problem, but it can be used to advantage by placing oft used commands in the north, south, east, or west positions and items for dangerous or destructive actions in the corners. Similarly, dartboard menus use equal radii for the annular regions to ensure equal length gestures in all directions. Rectangular grids allow smaller gestures along the axes for frequently used items, and require larger gestures for less likely or dangerous items placed in the peripheral corners.

e) It is easier to combine adjacent rectangular areas to provide a single item with a larger visual impact (menu item 136 in FIG. 9). The visual impact need not correlate with ease of selection, because the item can be placed further from the popup position so it subtends a smaller sector angle and requires larger gestures. This would be useful for 'Stop' or 'Cancel' items that need to be very obvious, but are rarely selected.

f) Any circular geometry has a single natural center. With a grid layout the menu designer can position the popup position (i.e. the position in grid which is centered over the current cursor position when the menu is popped up) almost anywhere in the grid without creating operator confusion. This makes it easier to provide natural groupings for menu items which is important in ease of learning and ease of use.

The ease of selecting a particular menu item is a function of the area of the item, the sector angle it subtends, and the distance from the popup position. Rectangular items on a grid layout provide the menu designer many more options than pie or dartboard menus in adjusting item locations and sizes to match frequency of use, to reduce risk of accidental selection, and to provide appropriate visual emphasis.

g) The menu shape is not constrained to a simple rectangle. For example, seldom used items can be 'dangled' off the bottom of the main menu rectangle (menu item 70 in FIG. 3), or a group of increasingly less likely options can extend out in a line from the main body (menu items 139, 140, and 141 in FIG. 10).

These and other advantages and features of the invention will become readily apparent to those skilled in the art after reading the following detailed description of the invention and studying the accompanying drawings.

DETAILED DESCRIPTION OF THE PREFERRED EMBODIMENT

The popup menus of the present invention can be implemented in a variety of systems. The preferred embodiment described here is in a personal computer comprised of a video display or liquid crystal display 40, a microprocessor 41, a mouse or stylus input device 42, memory 44, and the Microsoft® Windows® operating system. This system allows a single operator to multitask between several applications.

While the present invention could be incorporated into each application on the system, it is more flexible, more efficient, and eliminates any required revision of applications to place it in a separate task or in the operating system to make it accessible to all applications. The popup menu can be displayed by the operator at almost any time (Popup menus are not available when the system is in one of a few modal states such as initial system start-up, when a system dialog being displayed, when a task is locked, when a task is being initialized, or when a task is being shut down). When a popup menu trigger event is detected by the popup menu task, a menu appropriate for the operator, the active application, the trigger event, and the current system state is displayed.

The Apple® Macintosh®, IBM® OS/2®, and other personal computer operating environments are quite similar with respect to the features required to implement the present invention. For a network of personal computers, or for a multiuser system such as the X Window System®, the appropriate menu may depend on which operator requests it. This adds a few steps to choosing the appropriate menu, as described below.

Many devices contain embedded computers for additional flexibility and control. For example a programmable video cassette recorder (VCR) may use the television as a display, a joystick as an input device, a small amount of non-volatile memory, and a processor. The VCR control software is generally a single software component without the division into operating system and different applications as in the previous examples. This provides a simpler environment to implement popup menus. They can be incorporated directly in the device software.

Popup Menu Description

Figure 1:
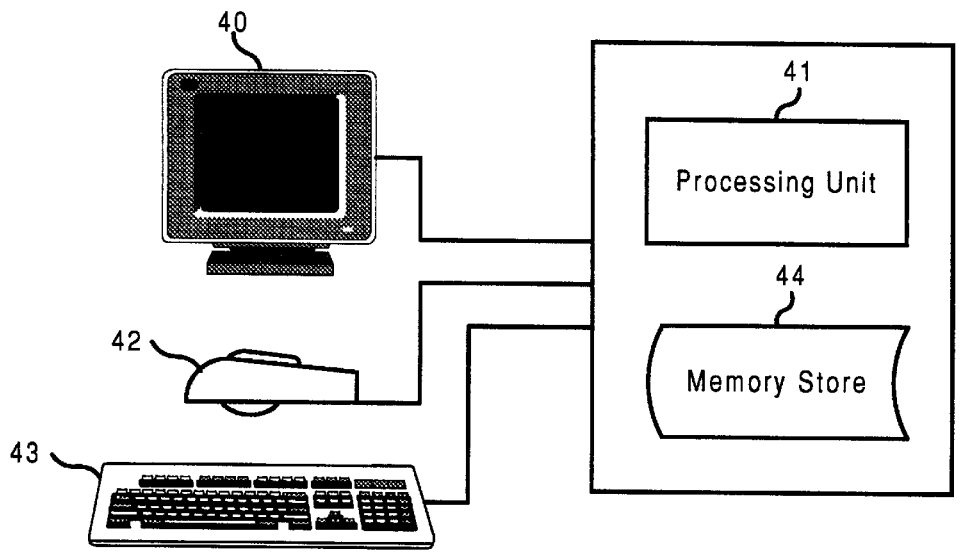
FIG. 1 is an illustration of an example apparatus for executing the popup menus of the present invention.
Figure 2:
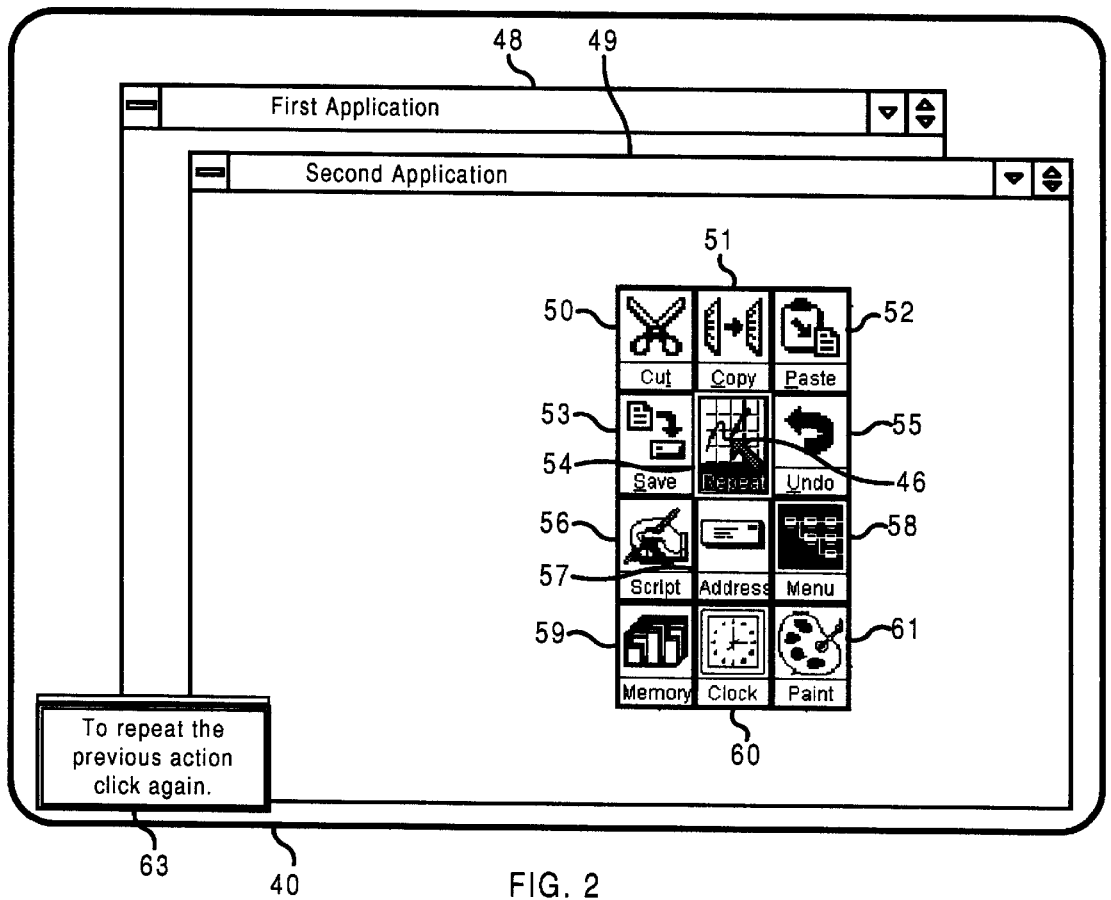
FIG. 2 illustrates a typical screen display for a popup menu in the preferred embodiment.

FIG. 2 illustrates a typical screen on a display 40 in the preferred embodiment. Two applications have been loaded by the operator and are represented by windows 48 and 49. The active application's window 49 is displayed on top and the operator has just requested a popup menu using a trigger event. This example uses a mouse button down event for the menu trigger, a drag with the mouse button down for the menu item scan, and a mouse button up to confirm selection of an item. The popup menu contains twelve items (50 through 61). It is displayed with the popup position 54 centered over the cursor 46.

The currently selected menu item (in this case the popup position 54) is shown with a reversed border to highlight it. Alternate highlighting schemes include reversing the color for the entire item or using a three dimensional chiselled look with the active item 'pushed in'. As the cursor 46 is dragged to adjacent items by moving the mouse with the button down, the highlighting will follow the cursor to always indicate which item would take action if the mouse button was released to confirm the end of the gesture.

Menu items can be represented by an image and a label as shown in FIG. 2. Either the image or the label may be omitted, but not both. Only in special cases, such as the trigonometry submenu 75 in FIG. 6, will the labels fit comfortably in a regular grid of reasonable size. More frequently, the labels are too long and must either be truncated (c.f. menu item 72 in FIG. 5) or abbreviated (c.f. menu item 74 in FIG. 6). The prior art has emphasized labels for menu items because they are easier to learn than images, but labels are very difficult to fit in a regular grid. The present invention uses a combination of images and labels for initial learning. Advanced operators can choose to use only images to reduce the size of the popup menu and increase display speed. To help the novice operator, a separate help window 63 is popped up at the same time as the popup menu. A short message describing the currently selected item is displayed in the window 63. Advanced operators can disable the display of this window or restrict it to simply showing the label for the current item.

Associated with each menu item is an action. Example actions are initiating application commands, launching new instances of an application, activating existing instances of an application, playing back a macro of recorded input events to repeat the sequence of actions quickly, executing a script of commands, or changing the state of a toggle variable. From the popup position 54, the operator can drag the cursor to one of the items. When he or she releases the mouse button to confirm selection of the current item, the popup menu and help window are removed and the associated action initiated.

The popup position 54 normally does not initiate an action on the first mouse button up event after the popup menu is displayed. This has two advantages. It avoids invoking any action if the trigger event is generated accidentally. It also supports a multiple click interface (one click to display the menu, possibly additional clicks to display submenus, and a final click to choose an action), instead of only a gestural interface (mouse down, drag, mouse up). However the popup position can initiate an action on the second mouse up. In this case it is used to repeat the previous action. Repetitive actions can be invoked with the trigger event and a click without even having to make a gesture.

Menu items 50, 51, 52, and 55 are a group of very frequently used edit commands (Edit Cut, Copy, Paste, and Undo) that almost every application supports. They are placed immediately adjacent to the popup position 54 in the preferred directions for right-handed people (up and right) to allow rapid selection. A left-handed operator can flip the arrangement horizontally. To promote consistency for the entire system, one menu for each application contains these items in the layout shown. This menu is normally invoked by a default trigger defined by the operator. If no menu is available for an application, a default menu description can automatically be adapted for that application. A consistent layout will encourage the operator to use reflex gestures to select these commonly used items when working with any Windows® application. Other commands, such as a file save command 53, can be placed at other locations in the menu depending on frequency of use.

When the operator chooses a menu item corresponding to an application command, the associated command identifier is sent to the application and the application takes action without being aware that the popup menu was involved. Any command in the application can potentially be accessed through a gesture by creating a corresponding menu item with the correct command ID in a popup menu. The application does not require any revisions to implement this capability.

A script menu item 56 is associated with an event recorder. If this item is chosen by the operator, the recorder keeps track of all input events until it is stopped. It creates a script from the events. The operator can then replay that sequence of events by using the repeat capability of the popup position, described above. The script menu item 56 acts as a scratchpad, so the operator can easily demonstrate a sequence of actions, while recording them at the same time, to make the sequence available for repetitive application. The script language is not restricted to regurgitating input events, but is a complete implementation of a programming language so powerful automation scripts can be created.

Sometimes a sequence of events or a script is used so frequently it is worthwhile assigning it to a permanent menu item. For example, an address menu item 57 can store the sequence of keystrokes used to create the operator's mailing address. Every time the address is required, the operator can select item 57 to have all the keystrokes entered automatically with no additional input effort. In this case the popup menu is used to automate data entry instead of control sequences, but both capabilities can be mixed.

A menu item can also be associated with an external module. Item 58, for example, will display the active application's menubar adjacent to item 58. The operator can then choose any application command without moving the mouse up to the menubar. The ability to interface to external modules makes it easy to extend the popup menu with additional capabilities.

Some menu items, like memory 59 and clock 60, simply display system status. Placing status indicators on a menu, rather than as a permanent fixture on the display, avoids taking up extra display space while still allowing a quick check with one gesture. Many people wear wrist watches, but very few wear them so the watch face is in their field of view at all times.

Corresponding to conventional user interface radio buttons and checkboxes, menu items can store a toggle state. They display the current state and will toggle to the next state when selected.

The action for a menu item can also be to activate an existing instance of an application or to launch a new instance of an application. Item 61 will activate the Paint application or launch it if it is not already loaded. This capability makes it easy to switch between applications even if an application's windows are completely obscured.

Menu Interaction

A gesture in the preferred embodiment has three parts:

A trigger event to display a popup menu. Example trigger events can be a mouse button press, a mouse button double click, a key press, a combination of a button press and one or more modifier keys down, a stylus tap with a button down, a specific gesture, a voice command or combinations of the above. The trigger event simply has to be distinguishable from input meant for data entry or input meant for other control functions. A trigger event must be operator definable. If the operator uses a three button mouse they may choose to use the middle mouse button down as the trigger event. If they only have a two button mouse they may choose the right button down in combination with the ALT key modifier. Different modifiers or different buttons can be used for the different popup menu definitions in a menu description file.

A scan or browse through the menu items to reach a particular one. Here the input device is used to reposition the cursor, highlighting different menu items along the path. Normally the mouse button is held down, the pen is held against the tablet, the stylus is held against the display, or the finger is held against the touchscreen during the scan.

A confirmation event to choose a particular item and initiate the associated action. This can be a mouse button up, lifting the stylus from the tablet, lifting the pen from the display, or lifting the finger from the touchscreen.

A gesture can also be abandoned in a cancel event to avoid taking any action if the menu was popped up accidentally. Releasing the mouse button, or lifting the pen, with the cursor outside the popup menu removes the menu from the display. An ESC keystroke can also be used. The help window 63 is removed when the popup menu is removed.

The preferred embodiment also has a keyboard interface. The trigger event is a press of a specific key, often in combination with a modifier key. The gesture is performed by holding down or repeatedly pressing arrow keys. Confirming the selection of a particular item is done with a press of the ENTER key. A submenu is displayed with the ENTER key as well. Similar to conventional menus, access or mnemonic keys allow quick selection of a particular item in the current menu, while shortcut or accelerator keys allow quick selection of an item in the current menu or any submenus thereof.

An alternate mode allows keyboard gestures. Here the trigger event displays the menu. Arrow keys are held down for navigation among the items using a repeat rate determined by the operator. Releasing all the arrow keys invokes the action for the current item without requiring a separate ENTER keystroke. Menus containing a double ring of items around the popup position work well with keyboard gestures.

Symbol Data Entry

In addition to the general menu applicable to all applications shown in FIG. 2, an operator can create specific menus for individual applications. Each application can have several different popup menus that are accessible through different trigger events. It is very useful to have additional popup menus not only for more application control, but also for specialized data or symbol entry. The address item 57 in FIG. 2 described above produced a sequence of data entry symbols to quickly reproduce the operator's address. This section shows the utility of popup menus in working with more complex symbols.

Figure 3:
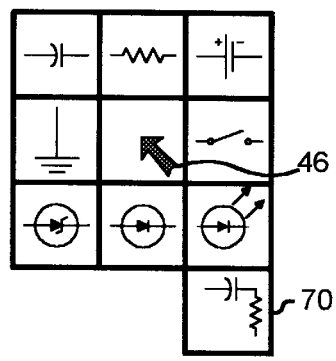
FIG. 3 illustrates a popup menu for a computer-aided design program for electronic design.
Figure 4:
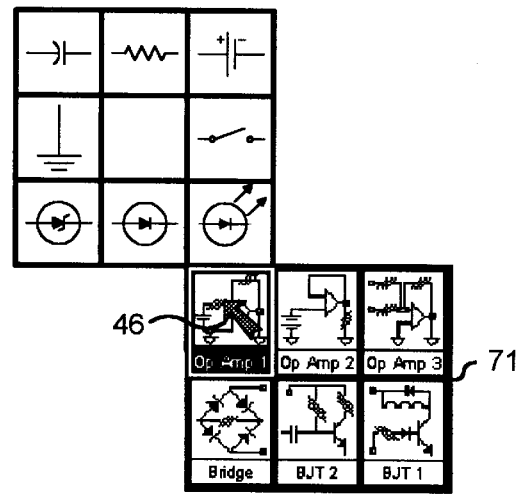
FIG. 4 shows the popup menu from FIG. 3 with a submenu containing more advanced components.

An elementary computer aided design (CAD) program for electronic design might provide a menu shown in FIG. 3. Basic electronic components surround the popup position, but one item 70 provides access to a submenu 71 in FIG. 4 containing basic circuits. When the operator drags the cursor 46 into the submenu item 70, this item displays the submenu 71. The operator can then drag to one of the submenu items to insert the corresponding circuit in one step. An advanced designer might exchange the submenu with the main menu because he or she would more likely to be using predesigned circuits, rather than individual components. Alternately, they may want to define two separate popup menus with two different triggers for easy access to both. The important thing is that they be able to customize the menu layout to their own preferences.

Figure 5:
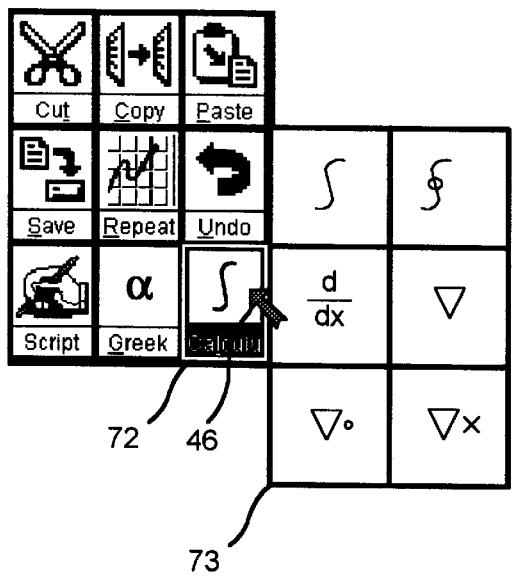
FIG. 5 illustrates a popup menu and submenu for a mathematical application emphasizing calculus.
Figure 6:
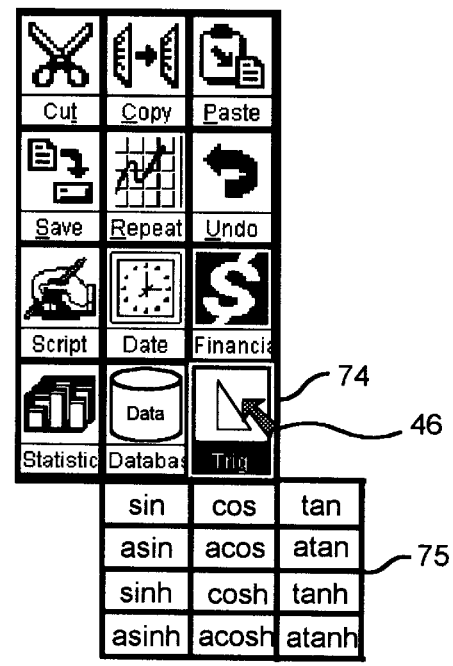
FIG. 6 illustrates a popup menu and submenu for quick access to functions in spreadsheets.

Similarly, mechanical CAD, architectural CAD, or illustration programs could have popup menus with the main drawing tools around the popup position and access to libraries of commonly used symbols or clip art in various submenus. Mathematical software would have tools for formatting subscripts, superscripts, italics, etc. around the popup position and submenus for greek letters, calculus symbols, operators, relations, logic symbols etc. FIG. 5 shows a sample menu for a mathematical application with quick access to calculus symbols in a submenu 73. Spreadsheets could have a popup menu containing submenus for the groups of commonly used functions, e.g. financial, trigonometric, date and time calculations, and database manipulation FIG. 6 shows a sample menu for a spreadsheet with a trigonometry submenu 75 displayed. Word processors could provide quick access to special typographic symbols such as en dashes, em dashes, bullets, and trademark symbols, as illustrated in submenu 130 of FIG. 7.

In each of these examples, providing the operator the capability of customizing the menu layout for his or her own needs is very valuable. An architect specializing in heating and ventilation could copy the piping and ducting symbols to a separate popup menu and eliminate the electrical and building material symbols to reduce clutter. At different phases of a project the architect could switch to different symbol sets. Allowing operators to customize the menus puts the menu design tools in the hands of those who best know which commands and symbols they use most frequently. It also greatly simplifies the programming effort to develop the underlying application since most of the specialized behavior can be left up to the operators.

Data Entry for Scripts with Ideograms or Large Alphabets

One very important aspect of the present invention is to simplify data entry in scripts that use ideograms or large alphabets such as Japanese, Chinese, Korean, etc. It is difficult to design or use a keyboard for one of these languages because of the numerous keys required. Written Japanese, for example, uses a combination of three scripts. Hiragana and Katakana each use fifty symbols plus modifiers to represent phonetic syllables. Kanji consists of more than three thousand logograms. Keyboard entry of a Kanji symbol requires first spelling the corresponding word phonetically with several keystrokes. The computer then matches phonetic input with a list of possible Kanji symbols and the operator chooses one of these. The matching is difficult to implement and the whole data entry process is slow in practice. Reducing ambiguity is difficult because many of the symbols are context dependent.

The present invention could provide three popup menus with different triggers for Hiragana, Katakana, and Kanji. One menu with several submenus would also work but would be less efficient for the operator. The Hiragana and Katakana menus would display the symbols grouped phonetically. Larger displays could provide all the letters in one main menu, while smaller displays would use submenus for the major phonetic groups.

Figures 7, 8A, 8B, 9, 10:
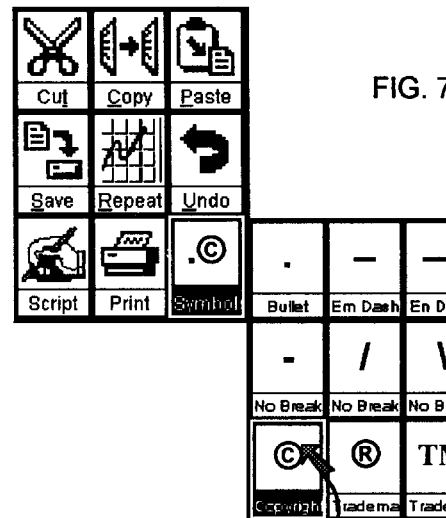
FIG. 7 illustrates a popup menu and submenu for quick access to special symbols in word processing.
FIG. 8A illustrates a popup menu for data entry of scripts that have large alphabets.
FIG. 8B illustrates a portion of a popup menu for data entry of scripts that use ideograms.
FIG. 9 illustrates a popup menu useful for entering digits on a pen-based or touchscreen system without requiring focused visual attention.
FIG. 10 shows the menu of FIG. 9 supplemented by exchange conversions for a currency trader.

FIG. 8A illustrates a sample Katagana popup menu with the items arranged by consonant so the directional gesture matches the initial stroke of the symbol as closely as possible. The majority of symbols start with a stroke going towards the right or down, so the popup position 132 has been moved up and left. The submenu 131 provides access to all the variations of the 'k' sound (ka, ki, ku, ke, ko, ga, gi, gu, ge, go, and variations). Further study is required to determine if alternate arrangements by vowel, by frequency of use, or by initial stroke direction might be more efficient. Popup menu design will often reflect a trade-off between ease of learning for the novice and efficiency of usage for the expert. It is important to keep the same menu layout for both groups so the novice only has to practice, and does not require retraining, to become an expert.

Kanji logograms could be arranged into submenus using radicals and stroke counts, much like a Japanese dictionary. FIG. 8B shows a portion, near the popup position 133, of such a menu. The layout tries to make the initial directional gesture similar to the first stroke of the primary radical in drawing the symbol, taking frequency of use into account. A primary menu could provide access to up to two hundred fourteen submenus for the radicals. The submenus provide quick access to the full Kanji symbols. Some radicals, such as the ninth one 134 according to traditional ordering (used for the idea of a person), are used in a great many derived symbols so they might be represented by more than one menu item on the primary menu. Similarly, less popular radicals could be combined to reduce the size of the primary menu. For small display screens the primary radicals may have to be grouped to introduce another layer in the menu hierarchy. Alternatively, progressive display and scrolling, described below, can be used to manage a large menu. Menu layouts according to stroke count, frequency of use, conceptual meaning, or initial phonetic syllable must be investigated to see if they are easier to learn or use.

Popup menus provide gestural entry of all the Japanese symbols without requiring an operator controlled matching process or a recognition engine. The operator chooses the correct symbol visually, so there is no ambiguity. Avoiding the matching or recognition step would be much easier to implement and would be quicker in use. Moreover, if the operator could produce additional popup menus containing the specific symbols he or she used most frequently, the access would become even faster. Professionals or specialists would create popup menus with the specialized symbols used in their work for direct access.

Notepad and Whiteboard Computers

Traditional office automation computers have emphasized a dialog between the operator and the machine to perform a specific task. An alternative use of computers is for note taking during a conversation between people. Whiteboard computers record notes and explanations during a presentation or working session. Notepad computers are small, hand-held pads meant for taking notes and filling in simple information with a pen or stylus. Typical applications include a doctor filling charts while making the rounds with patients, a journalist taking notes during an interview, an attendant checking in a car after a car rental, and an architect reviewing progress at a construction site. In each of these cases the primary dialog is between the notepad operator and the patient, the interview subject, the rental client, or the construction contractor—it is not between the operator and the computer as in conventional office automation. The notepad is a device to keep track of information while engaged in a conversation with another person, but it is not part of the conversation and should require as little attention as possible.

These computers have emphasized a pen or stylus as an input device because it is familiar, small, and easy to use. Current pen input has three significant problems:

the operator training time for the symbolic control gestures (the data entry gestures are generally familiar digits and letters but the control gestures are often proofreading commands), the difficulty of accurately recognizing the operator strokes or gestures, the level of attention required to work with the computer.

FIG. 9 shows a popup menu designed for entering numeric data into a field using directional gestures. The layout is the similar to keypads on keyboards, point-of-sale cash registers, adding machines, or telephones. To use this popup menu the operator positions the cursor over the field requiring numeric input and enters a trigger event, for example a double tap with the pen. The menu pops up centered over the middle item containing the five digit 135. A short gesture in one of the directions with the pen down highlights another digit. Lifting the pen enters digit n the current item into the field. The menu items at the bottom provide backspace 138 and start over 137 options. Additional menu items could readily be added for cut, copy, paste, insert or undo commands or other functionality shown in FIG. 2.

This menu does provide an action in the popup position 135, namely entering the five digit, in contrast to the popup menus described earlier. The advantages of retaining a familiar, efficient keypad layout and the ease of undoing a mistakenly entered five digit make this design feasible here. Larger, potentially more destructive, actions should not be associated with the popup position.

This menu requires initial training only in how to trigger the menu popup and then drag to one of the items. Thereafter the operator merely requires practice to turn the gestures into reflex actions that can be performed with minimal attention to the interface. The popup menu allows the operator to recognize the items when required, while simultaneously providing and encouraging the use of a faster recall interface for advanced operators.

Many pen-based computers require the operator to write the digits in the entry field. While writing may seem more intuitive initially, it requires more training to learn the editing gestures (delete, insert, copy, etc.) since they are learned by recall rather than recognition. It is also very difficult to write digits without looking at the screen. The problems are not only in forming the digits correctly, but also keeping the pen within the boundaries of the numeric field. The less attention the operator pays to writing, the less legible the result, the harder it is for the computer to recognize, and the greater the error rate. One alternative disclosed in U.S. Pat. No. 5,276,794 to A. C. Lamb pops up a modal dialog box containing a simulated keypad for data entry. Digits are chosen by tapping on buttons on the dialog and the dialog is dismissed to finalize the entry. This again requires close attention by the operator which distracts from the primary conversation. Directional gestures require less visual attention.

Hand written input also requires a recognition engine. The engine is difficult to implement and has high error rates for less than ideal handwriting. When using directional gestures in popup menus the full path of the gesture need not be recorded because the currently selected item can be determined from the current cursor position and the previous selected item. When submenus overlap part of the primary menu (or each other) there may be more than one menu item for a particular display position at different points in time. However the correct item can be determined from the previously selected item and the current cursor position instead of having to retain a full path of the gesture.

Tracking cursor motion in a popup menu is simpler than trying to recognize and match a complete symbolic gesture. The implementation is easier, faster, smaller, and more accurate. When using directional gestures an operator can also change her or his mind and back up to a previous item, unlike symbolic gesture interfaces.

It is also very easy to extend popup menus. FIG. 10 shows a variant of the menu from FIG. 9 which a currency trader might have designed. Items 139, 140, and 141 convert the entered numeric value from one currency to another using a stored exchange rate. The currency trader can enter an amount in any of these currencies and immediate change it to the value requested by the application, all without revision of the application.

Scrolling and Progressive Display of Popup Menus

Notepad computers can have very small displays which makes it difficult to display menus containing many items, such as the menus proposed for ideographic languages above. Two possibilities to manage large menus are scrolling and progressive display.

If a popup menu is larger than the display or extends off an edge of the display and a gesture is made towards that edge, then the whole menu could be scrolled away from the edge to allow display of additional items. When the cursor is within a menu item dimension (width or height depending on whether it is a vertical or horizontal edge) of the edge of the display, the currently visible menu items are all scrolled away from the edge. Then additional menu items are drawn in the gap at the edge of the display. For a relative pointing device like a mouse, the cursor could be scrolled with the menu so the gesture works as before. An operator using an absolute pointing device like a pen on a tablet, a stylus on a display, or a finger on a touchscreen would simply hold the pointing device near the edge and let the items scroll past the cursor The rate of scrolling can depend on the proximity of the cursor to the edge for very large menus.

Figure 11:
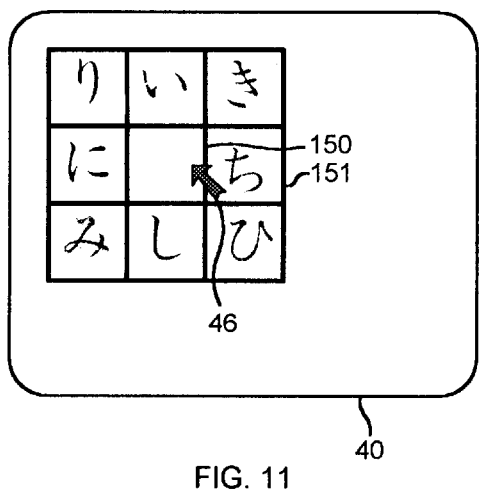
FIG. 11 illustrates a popup menu with progressive item display when it is first popped up.

Another solution is progressive display of additional items as a gesture is moved in one direction. FIG. 11 shows a menu on a very small display 40 for Hiragana sounds using the vowel 'i'. The menu items are arranged approximately in the direction of the first stroke for the characters around the popup position 150. Hiragana has several modifications to these characters which are used in special circumstances. They are not shown when the menu is first popped up to avoid covering up too much of the work space, to minimize the visual clutter for the operator, and to minimize pop up and pop down time by reducing the amount of drawing to be done.

Figure 12:
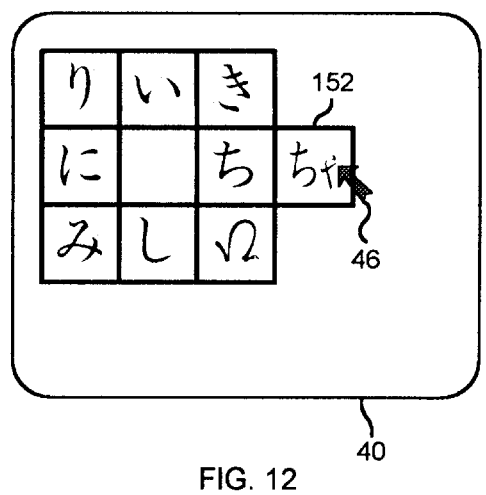
FIG. 12 shows the menu of FIG. 11 with the first new item displayed.
Figure 13:
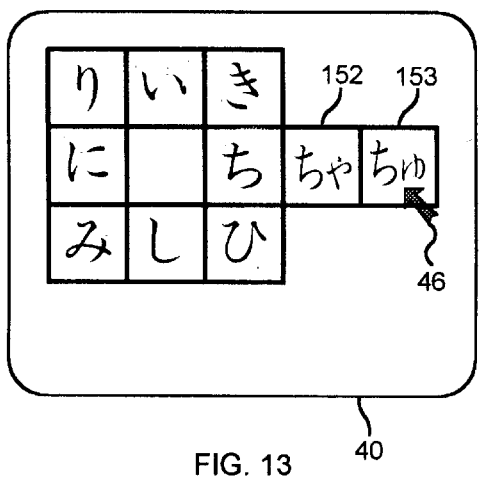
FIG. 13 shows the menu of FIG. 11 with the second new item displayed.
Figure 14:
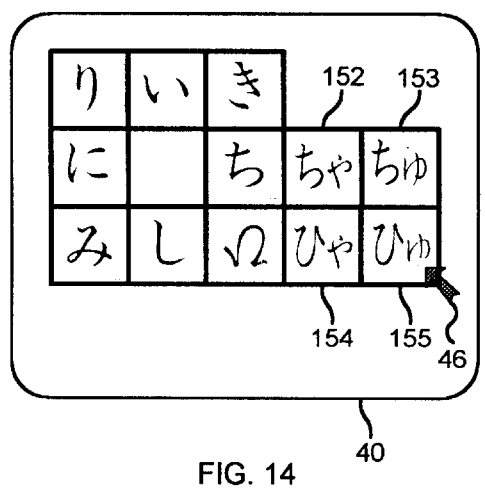
FIG. 14 shows the menu of FIG. 11 with a new row of items displayed.

The cursor 46 is being dragged right through the symbol for 'ti' 151. Once the cursor 46 moves to the right of item 151, the first modification to 'ti' is displayed (item 152 in FIG. 12). Further movement to the right past the edge of item 152 brings up item 153 in FIG. 13. Movement down displays two variations on the 'hi' sound, item 154 and item 155 in FIG. 14. Item 154 need not have been displayed if the cursor path was being tracked exactly, but there are several benefits to filling in the gaps and avoiding concave shapes. It helps an operator who is searching and is near the correct item, but may have overshot it. It also greatly simplifies the hit detection algorithms because the menu shape can be represented by fewer rectangles.

Figure 15:
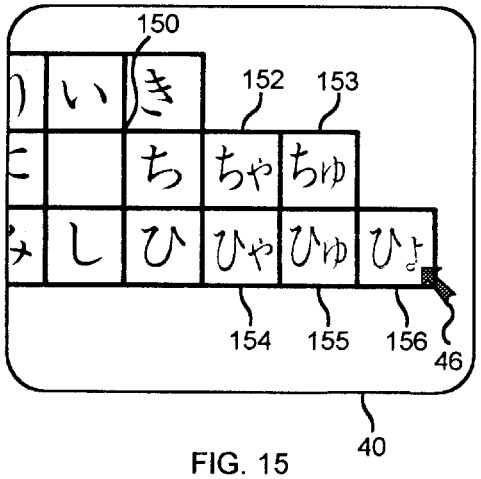
FIG. 15 shows the menu of FIG. 11 scrolled left to accommodate the next new item.

If the operator drags right past the edge of item 155, the cursor 46 is within one menu item width of the edge of the screen. In this case the rest of the menu is scrolled left (FIG. 15) and the new item 156 is displayed at the cursor position 46.

Scrolling and progressive disclosure of popup menus makes it possible to use large menus without too much visual interruption and redrawing. One issue with both techniques is how to produce a cancel menu event. Normally, a mouse button up outside any menu item is interpreted as a cancel event and the menu is removed without taking action. It may take a long time to scroll to the edge of a large menu. Cancel events are likely to be infrequent, so this may not be a problem. It may still be necessary to provide a cancel menu item (possibly a second click at the popup position) or a separate cancel event such as the ESC key.

Geometric Variations

These examples of popup menus have all used rectangular menu items positioned on a rectangular grid. Prior art has suggested pie shaped or annular items in circular layouts which are particularly inefficient in space. Alternate arrangements using triangles, hexagons, etc. are also less space efficient because they do not fit the prevailing rectangular text and icons very well. They may have some utility in very specialized applications where the shape is a natural fit.

Figure 16:
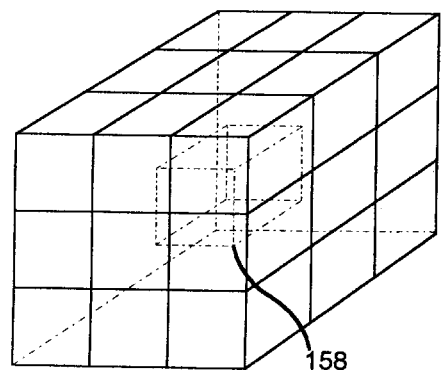
FIG. 16 illustrates a three-dimensional popup menu allowing gestures in all directions.

Extending popup menus to three dimensions (FIG. 16) allows twenty six menu items adjacent to the popup position 158 instead of the eight available in a planar popup menu. Here a virtual reality environment is used as the display 40, a (very powerful) processor 41 generates the simulated environment, and a SpaceMouse™ or DataGlove™ is used as an input device 42. The popup menus are composed of cubic or parallelepiped menu items containing three dimensional representations of actions. They surround the operator's hand and gestures can be made in all directions. The trigger event to display the menu can be as simple as pressing a button or may require recognition of a particular gesture. Touching or grasping a menu item invokes the associated action.

Menu Description File Format

Figure 17:
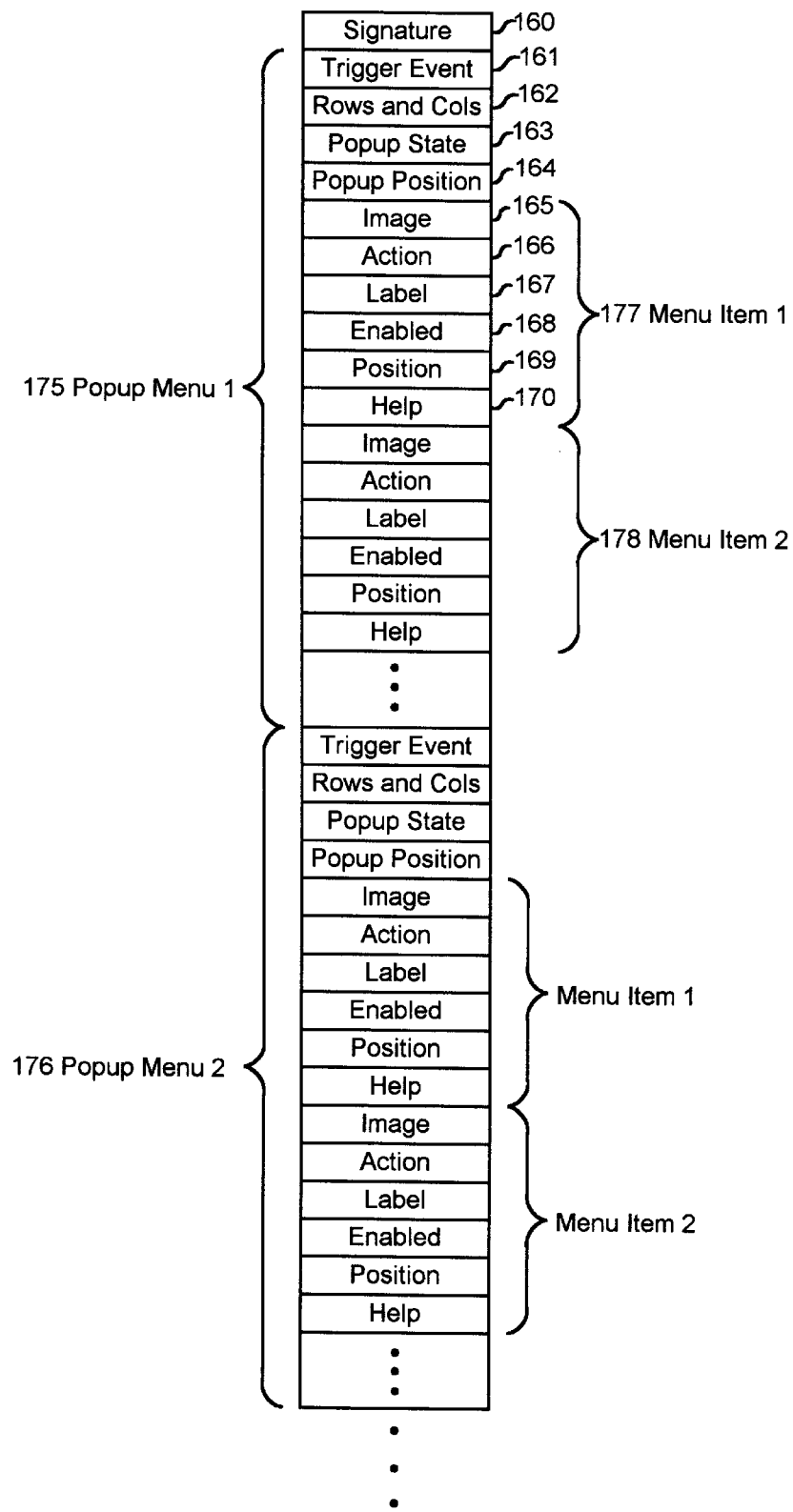
FIG. 17 shows the structure of a menu description file.

FIG. 17 shows the structure of a menu description file containing several popup menu definitions 175 and 176. The file begins with a signature 160 to verify the type of file before reading it. Each popup menu definition 175 contains fields describing the menu and a list of menu items 177 and 178. A trigger event 161 and popup state 163 must be matched before a menu is popped up, as described below. The outer bounds or bounding rectangle of the menu are given by a rows and columns field 162 to establish the regular grid coordinates. A popup position 164 (given in terms of the regular grid coordinates) is used to position the menu when it is first popped up. A popup menu definition might be empty, except for the trigger and state fields, to signify the trigger event should be ignored for these conditions and no menu should be popped up.

The menu items 177 and 178 in the popup menu definition each have six fields. An image 165 is either a bitmap or a set of drawing instructions (a metafile) to represent the menu item on the display. A label 167 can also be used to represent the menu item on the display. Either the image or the label, but not both, can be omitted. An action field 166 contains a type field, data specific to the type of action, and a set of conditions under which the action can be invoked. For example, the paint launch action 61 of FIG. 2 would store the full file name of the paint application. The address action 57 would contain the sequence of keystrokes required to reproduce the operator's address. If the action is to display a submenu, a link or reference to the submenu definition and the submenu display delay time are stored in the action field. An enabled field 168 controls whether the menu item responds to a confirm selection event. A position field 169 is used to draw the image and label in the correct place in the regular grid. A help field 170 contains the string to be displayed in the popup help window 63.

OPERATION

FIGS. 18 to 21 are flowcharts for the operation of the present invention. An operator controls the computer system and enters data using one or more input devices 42. Sample input devices include a mouse, a keyboard, a pen on a tablet, a stylus on a notepad computer, a finger on a touchscreen, a DataGlove™, or the eye-tracking mechanism in a heads-up display. Any input device or combination of input devices that can generate a menu popup trigger event, can be used to direct cursor position, and can produce the confirm menu item selection event will work.

The preferred embodiment places a hook in the event input queue to detect all operator input events. The hook is notified 81 every time the operator has produced an input event. A similar function is performed by input interrupts or input filters in other personal computer systems. In a simpler system that allows only a single task at a time, such as a computer embedded in another device, a polling loop can be used to wait for the operator input.

If a popup menu is not currently displayed 82, the input event is checked 83 against the previously defined trigger events. If a match is found the menu will be displayed, as described in greater detail below with reference to FIG. 19. If the input event doesn't match any trigger, then it is passed on to the system for normal processing 84.

If a popup menu is currently displayed 82, the input event is checked against several alternatives to decide what to do next. If it is a cancel event 85, the menu is removed 86 from the display and the system goes on 80 to additional processing or waiting for the next input event. If the help window 63 was popped up with the menu, it is also removed with the menu.

The current or highlighted item is changed during the scan part of a gesture. The current item is visually highlighted using something like a reverse border, inverted colors, or pushed in look for chiseled simulated 3D display. If the event is a change item or scan event 88 and a key or button is held down 89 to indicate the menu should stick to the cursor, then the menu is moved with the cursor 87, rather than moving the cursor over the menu. This makes it easy for the operator to reposition the menu.

If the sticky key is not held down and the cursor moves outside the current item 90, then the new cursor position is checked against the positions of the other items in the menu. If the cursor is in a new item 91, the highlighting is removed 92 from the previous item and applied to the new item to indicate the current item has changed. The help text for the new item is sent to the help window 63 in FIG. 2. The check for a new item 91 involves more work for scrolling or popup menus, as described with reference to FIG. 20 and 21 below.

If the action for the new item is a submenu 93, then a submenu display event is sent 94 after an operator adjustable delay. Menu items positioned on the edge of a menu, as shown in FIGS. 4 to 7, can be displayed immediately to allow a smooth, uninterrupted gesture in selecting the submenu items. If the menu item with a submenu is in the interior of a menu, such as some of the items in FIGS. 8A and 8B, then some delay may be required to allow scans across the item without popping up the submenu because it may obscure nearby items. The delay has to be operator adjustable to account for the position of the item in the menu and for the different reaction times and skill levels of operators, ranging from handicapped to advanced operators.

To create the delay the current menu item position is stored in a global variable and a Windows® timer is set to go off after the required delay time. Any changes to the current menu item clear the global variable. If the current menu item has not changed when the timer goes off, the display submenu event is sent.

If the event is a confirmation event 95 the current item state is checked. If the current menu item has an associated action (unlike the informational items 59 and 60 in FIG. 2) and the item is enabled, then the popup menu (and help window 63, if displayed) is removed 96 from the display and the action for that item is initiated 97. If the menu item doesn't have an action or is disabled, then the confirmation event is simply ignored. In this case a later mouse down event highlights the item under the cursor and starts a new gesture.

Figure 19:
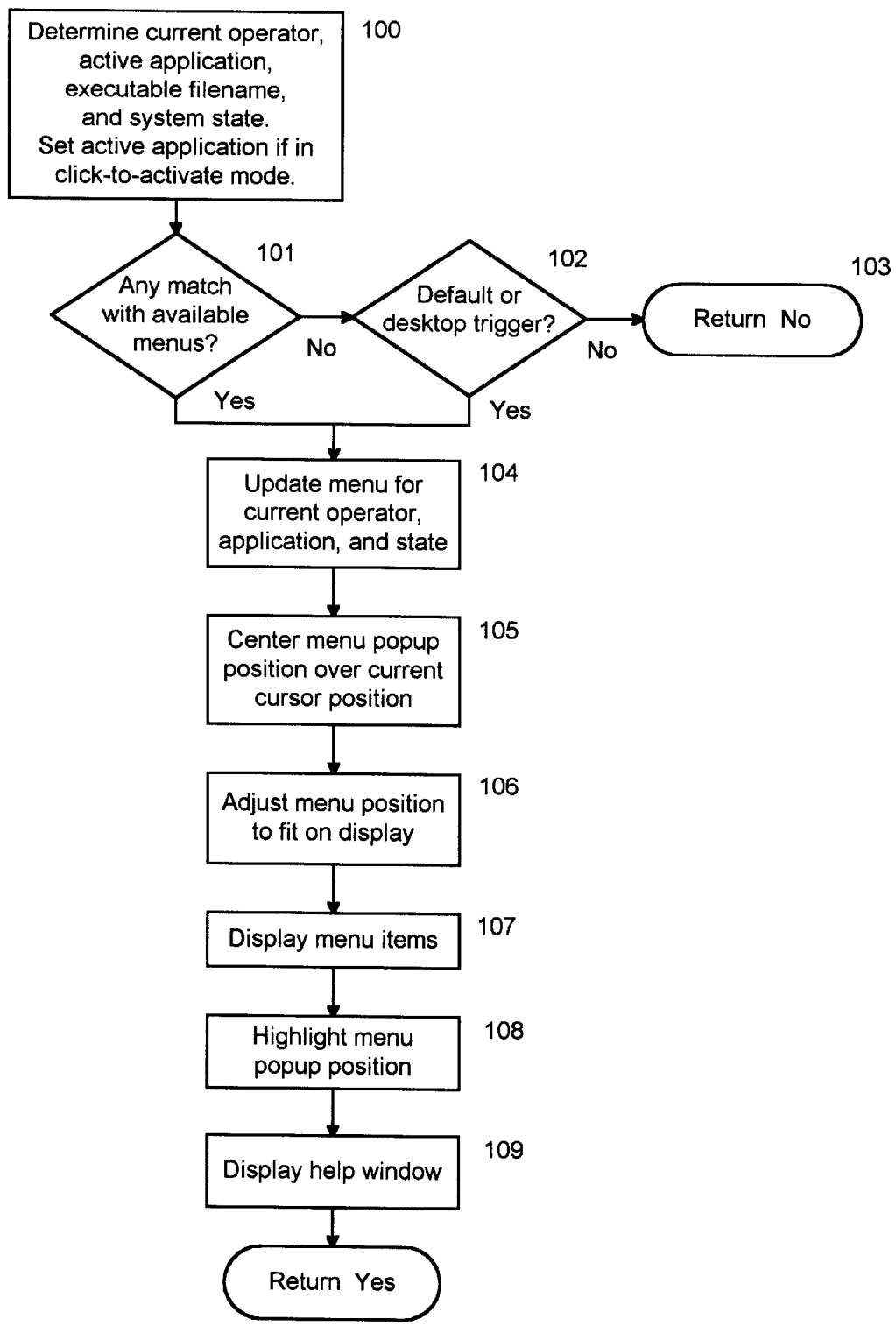
FIG. 19 provides greater detail for step 83 in FIG. 18.

If the event is a display submenu event 98, then the submenu is updated and displayed 99 using the steps 104 to 108 of FIG. 19.

For popup menus in three dimensions, the operation is as described here, except every coordinate comparison involves a depth component, as well as the row and column components.

Automatically Choosing the Appropriate Popup Menu

If a popup menu is not currently displayed 82, the event is checked against the trigger events in the menu definitions in the menu description files. As shown in FIG. 19, first the current system state is determined 100. This state, along with the trigger event, is used in choosing which popup menu to display. The state includes the operator providing the input if it is a multiuser system or network, the active application in a multitasking environment, the state of any modifier keys or buttons for the event (e.g. are the ALT, SHIFT, or CONTROL keys down?), the current cursor position, the window under the current cursor position, and if the system is in a modal state. System modal states occur when a dialog is being displayed, the mouse is captured, an application menu is being tracked, a system modal dialog is displayed etc. 'Application' menu refers to the standard pull-down or pull-right menus provided in the Windows® operating environment, not the popup menus of the present invention.

The active application owns the front-most or active window on the display and in most cases it is appropriate to display a menu for that application. For large displays which can show several application windows side-by-side, or for embedded objects in an application, the cursor may not be over the active application at the time of the trigger event. The preferred embodiment provides a different click-to-activate mode. In normal operation the operator would have to click on the new application or embedded object to switch the active application and would then use a second mouse down to generate the trigger event for menu popup. If the operator's profile indicates a preference for click-to-activate, the first click can be eliminated and the operator can activate a new window and popup the menu for that window on the first mouse down. In this mode the active window is changed automatically in step 100 using the window under the current cursor position at the time of the mouse down event.

The name of the executable for the active window is determined from the filenames stored in the Windows® module database. Menu description files are assumed to be stored under the same filename as the application for which they were designed. For example the Program Manager executable is 'progman.exe' and the menu description file is assumed to be 'progman.md'.

Using the state from step 100, the input trigger is matched against a list of stored popup menu descriptions to check if there is a match 101. The following design code will be described in the paragraphs that follow, for each menu description file in the private, group, and public directories for the operator
    if the root filename matches the root filename of the active application executable
        load the menu description file
        for each menu definition in the file
            if the current event matches the trigger event and the current system state is appropriate for the popup menu definition
                display the menu
        next menu definition
next menu description file On a system with multiple operators or on a network of computers, each operator has a directory containing menu descriptions private for his or her own use. Additional directories can be created to store menu descriptions to be shared among all the members of a peer group; one group per directory. Finally there is a public directory of menu descriptions for use by all the operators in the system. The matching step searches through the private, group, and public directories in sequence to find a match for the menu description filename. Private descriptions take precedence over group descriptions which take precedence over public descriptions, so each operator can customize the menus at the appropriate level without affecting the menus used by peers. These directories create a hierarchy in the menu descriptions ranging from very narrow to very broad access.

The directory names and the search order for the group directories are specified in a profile or '.ini' file. The profile file contains many other operator preferences such as the default menu trigger event, the desktop menu trigger event, the toggle sticky state event, grid geometry, whether and where to display the help window 63, etc. A default profile is available, but each operator can define a personal profile file and provide it as a command line argument to the popup menu program to override the default version.

If a menu description file is found with a matching filename, it is loaded to search for a popup menu definition 175 in FIG. 17 for the trigger event. If the trigger event in one popup menu definition matches the input event, then the popup conditions 163 are checked against the current system state. For example, if the operator has indicated the menu should not be popped up when a system modal dialog is displayed and one is currently displayed, then the trigger event is ignored. Other modal states (e.g. mouse capture, application menu in use, task locked, etc.) are handled similarly. The popup menu can also depend on the type or id of the window under the current cursor position to provide context dependent menus. For example, the popup menu of FIG. 9 applies to all windows of type 'numeric entry field'. If the window type and id don't match, the search continues with the next popup menu definition or next menu description file.

If no match for the trigger event and system state is found in the menu description files in all the directories, then the event is compared 102 against default and desktop triggers. If either of these match, then the default or desktop menu, respectively, is loaded. The default menu is a simple, generic menu much like the one in FIG. 2, that can be used with almost any application. The desktop menu contains mostly application and document launch and activate items. It may contain some stand-alone scripts, for example, to rearrange the windows on the display or to restart the operating environment. It shouldn't contain any application command menu items. If the event wasn't a desktop or default trigger 103, then it is passed on for normal application processing 84 in FIG. 18.

Menu Update and Display

If a menu definition was found for the trigger event, or the default or desktop menu is to be displayed, the menu first has to updated 104 using the current system state. The items in the menu are enabled or disabled depending on the modal state of the system. Some actions, such as exiting an application or shutting down the operating environment, may be inappropriate when the system is in the middle of tracking an application menu or has a modal dialog displayed. These items are disabled to ensure the operator cannot mistakenly select them.

Application commands, such the editing commands 50, 51, 52, and 55 of FIG. 2, require verification that the command ID is correct before they are used. This step is essential in providing compatibility for applications that were not designed for use with popup menus and for allowing a generic default menu that can be used with any Windows® application.

For an application command, an action 166 of FIG. 17 in a menu description file stores the name and position of the application menu, and the name and ID of the application menu item. Note again that application menu and application item refer to the pull-down or pull-right menus in the Windows® operating environment that applications use, not the popup menus and items of the present invention. Standard Windows® system calls are available for querying an application menu and its items for names, positions, IDs, and enabled or disabled state. Using these calls the application menu and item names are verified against the application menu position and item ID to be sure the correct command will be sent if the popup menu item is chosen. If the verification fails, the popup item can simply be disabled or all of the application menus and items can be searched recursively for a match (option 208 in FIG. 22). The default menu always undertakes a search to see if it is at all possible to find the correct command in the application. Some application items, notably the common Edit Undo item, provide different names for the undo action at different times, such Undo Typing, Undo Delete, or Undo Paste. For these situations a partial match can be used, corresponding to option 207 in FIG. 22.

To ensure menu items for the very frequently used edit commands (cut, copy, paste, undo, and clear) work whenever possible an additional check is made. If the menu item has been flagged as a special edit command 205 in FIG. 22 and the verification and the search steps described above both fail, then type of window under the cursor is checked against a list of edit window classes stored in the profile file. If one of the class names match, then an attempt is made to communicate using the edit protocol for the standard edit control. This additional step allows the popup menus to be used in dialog boxes even when standard application menus are disabled.

Figure 22:
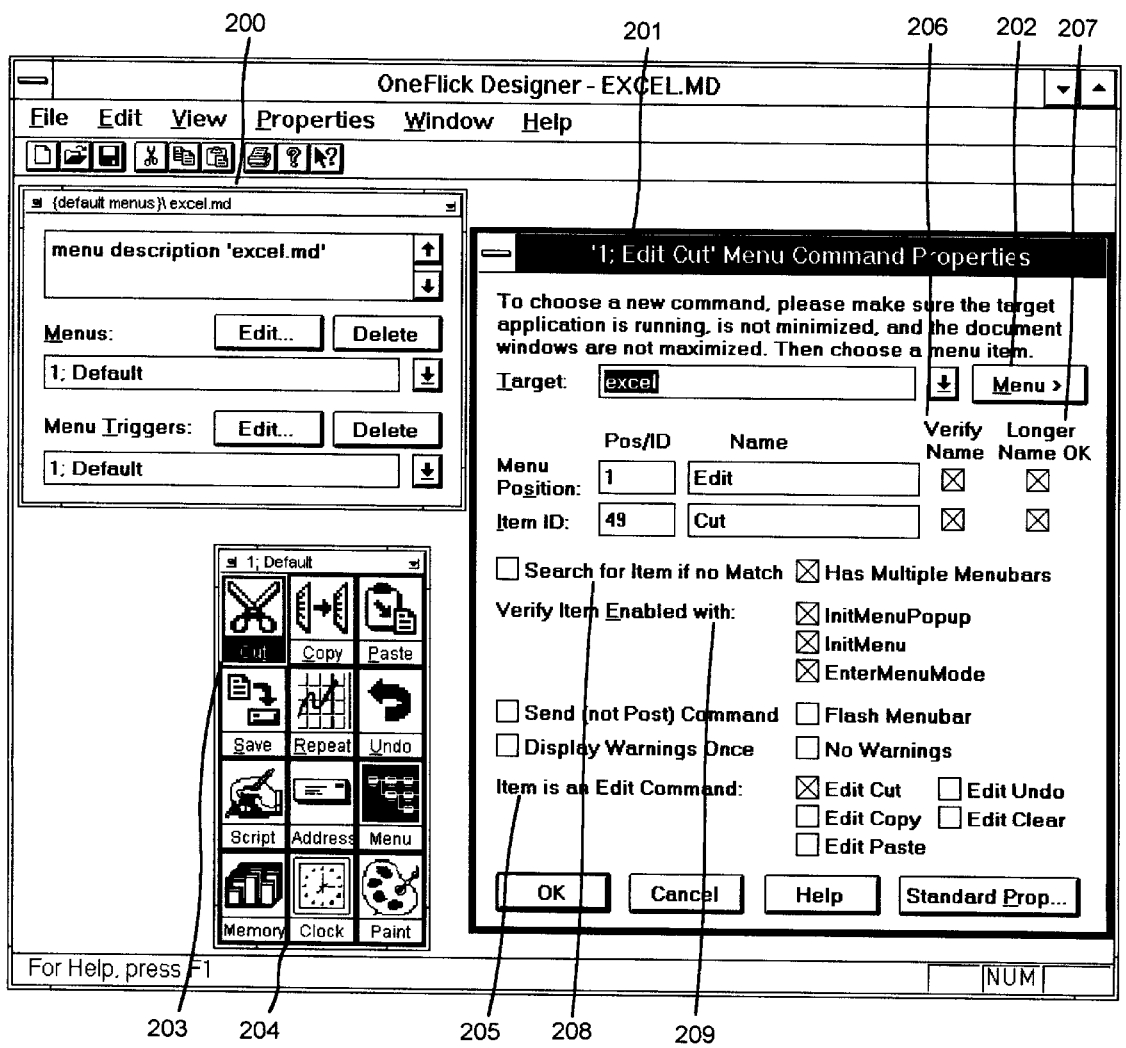
FIG. 22 illustrates a menu design facility.

If the popup menu has been customized with the correct item ID for a specific application and has been previously tested, the verification step can be turned off 206 in FIG. 22. In this case the application menu item state can be queried to update the popup menu item state. For example, the application menu item may switch from Undo Typing to Undo Delete and this change can be reflected in the popup menu item label.

In a Windows® application, application menu items are enabled and disabled as the operator works with the application to ensure the operator doesn't choose an inappropriate action. For example, when the operator hasn't taken any actions yet there is nothing to undo so the Edit Undo item is disabled. When the operator hasn't selected any objects the Edit Cut item is disabled. When the operator has cut something to the clipboard, it can be pasted so the Edit Paste is enabled. Applications normally set the command availability status in response to one of three messages generated by the system, the WM_ENTERMENULOOP, WM_INITMENU, WM_INITMENUPOPUP messages (see option 209 in FIG. 22). To ensure the popup menus don't allow inappropriate menu choices, the present invention simulates the system by sending these three messages for each application command. It thereby forces the application to update the state of the application commands used in the popup menu items. Then it queries the application menu item for the enabled or disabled state and sets the popup item availability appropriately. Simulating the system in this way allows popup menus to be designed and used with any Windows® application, even though the application wasn't designed for and is completely unaware of popup menus. The popup menus prevent the operator from selecting inappropriate actions, just like the built-in menus.

In scrolling or progressive disclosure popup menus, only the items that will be displayed immediately need to be updated. The other items can be updated as the scroll or gesture brings them into view, as described below with reference to FIGS. 20 and 21.

Once the menu has been updated properly 104, a window is created to hold the popup menu items. The window position is adjusted 105 so the center of the popup position matches the cursor position at the time of the trigger event. Consistently centering the popup position over the cursor allows directional gestures without having to pay close visual attention to the menu position.

For relative pointing devices such as a mouse, the menu position can be adjusted 106 if it would extend off the display for a popup request near the edge of the display. Both the menu and the current cursor position are adjusted by the same amount to ensure directional gestures work as before. For absolute positioning devices like a pen on a notepad, a stylus on a tablet, or a finger on a touchscreen the cursor should not be moved by software so the menu position is not adjusted to fit on the display. Rather, the operator is given a 'sticky' key or button option. When the sticky key or button is pressed and the cursor is moved, the menu moves 87 in FIG. 18 with the cursor rather than highlighting different items. The operator can move the menu away from the edge.

This capability is also useful for moving popup menus if they happen to obscure the object of interest in the work area. If scrolling popup menus are used, then the menu position is generally not adjusted on popup.

Once the menu window has been positioned, the item images 165 and labels 167 in FIG. 17 are drawn 107 in FIG. 19 in the grid layout in the window. Disabled items are drawn in grey or with a reverse shadow to indicate the corresponding action is not available. A highlight is drawn 108 around the popup menu position to show it is the current item and the directional gesture can begin. Finally, the help window 63 of FIG. 2 is displayed 109.

Scrolling and Progressive Disclosure Popup Menus

Figure 18:
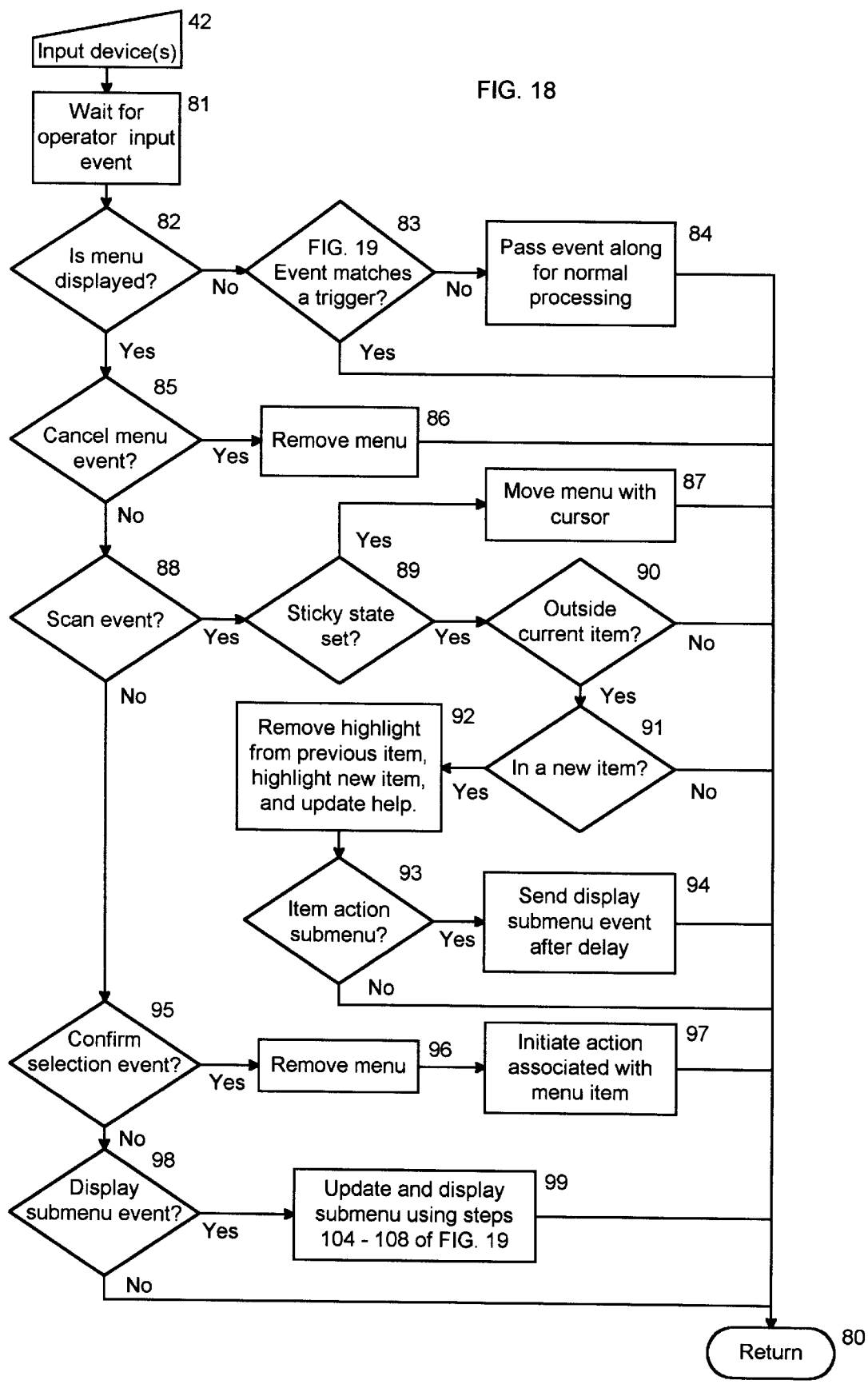
FIG. 18 is a flow chart useful for explaining the operation of the popup menus of the present invention.
Figure 20:
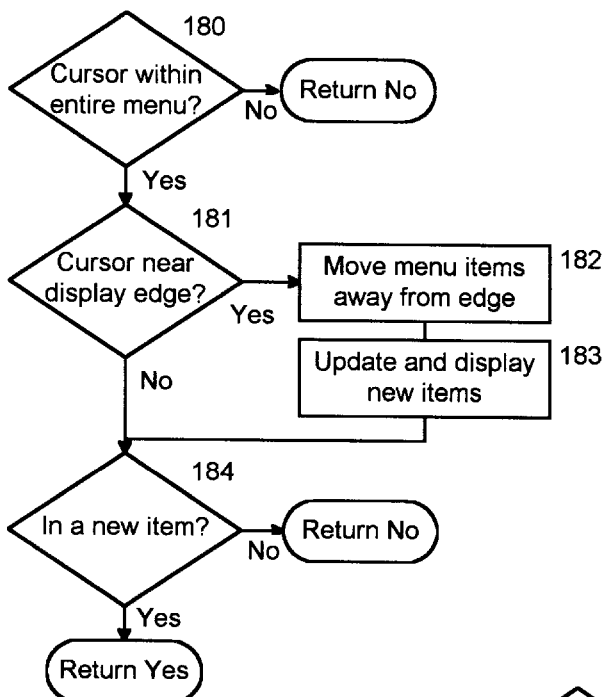
FIG. 20 provides greater detail for step 91 in FIG. 18 for a scrolling popup menu.

A scrolling popup menu requires a few more checks than step 91 of FIG. 18. The new steps are shown in FIG. 20. The cursor position is checked 180 against the extent of the entire menu, i.e. the range of possible menu item positions indicated by the rows and columns field 162 in FIG. 17. If it is outside this range then no scrolling need be done and the cursor won't be inside a new menu item so the routine returns no.

Next the cursor position is checked 181 against the display edges to see if it is within one menu item width or height of a vertical or horizontal edge, respectively. If the cursor is within one menu item dimension of an edge, then the currently displayed menu items are scrolled 182 away from the edge to make room for the new ones. If the cursor happens to be in a corner, scrolling may be done in both directions. The menu items are scrolled far enough to leave a gap a little larger than the menu item width or height. This ensures the cursor can be pulled past the edge of the new items to indicate further scrolling. The new items are then updated 183 for display, as in step 104 of FIG. 19, and are displayed adjacent to the old items, leaving a small gap near the edge of the display.

Finally, the cursor is checked 184 against the positions of the new menu items to see if it is inside one and the result is used in FIG. 18, step 91 as before.

Figure 21:
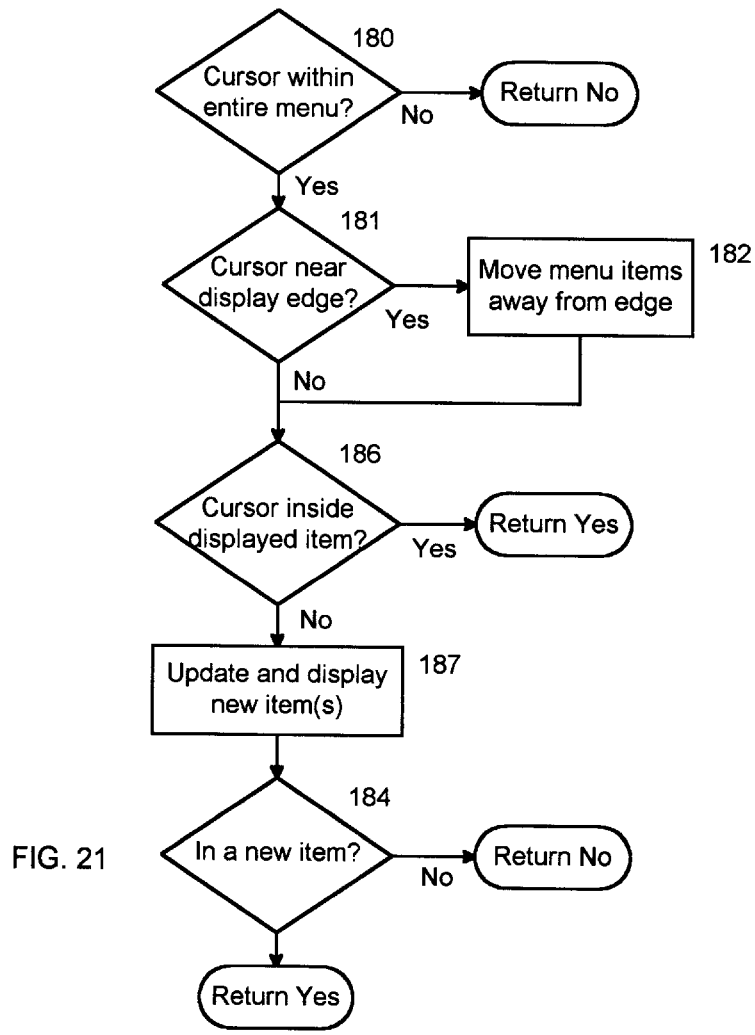
FIG. 21 provides greater detail for step 91 in FIG. 18 for a popup menu using scrolling and progressive disclosure.

A progressive disclosure popup menu adds a few more steps as shown in FIG. 21. The initial steps 180, 181, and 182 comprising the scrolling are as before. If the cursor is within 186 a currently displayed item simply return yes. Otherwise check 187 if there is a potential item under the cursor position. If there is, mark it for display. If concave regions are to be avoided to minimize problems with operator overshoot, form a rectangle between the new item and the furthest corner of the popup position 150 in FIG. 11. Mark for display all potential items in that rectangle that are not currently displayed. Update 187 all the marked items, as in step 104 of FIG. 19, and display them, and return yes. Then check 184 if the cursor is in a new item, as before.

Menu Design Facility

To allow an operator to customize the popup menus for his or her own most frequently used actions, a menu design facility is required. It reads menu description files and displays the menu items for each popup menu definition in a window. It provides commands to select, create, cut, copy, delete, paste, and edit properties of an item or of a menu using techniques that are well-known. The operator can create a menu to control a particular application by creating items that correspond to the application commands.

FIG. 22 illustrates a display of a menu design facility. The menu description file 'excel.md' for the Microsoft® Excel® spreadsheet application has been read in and the list of menu definitions is accessed through window 200. The default menu for this application has been loaded and is displayed in window 204. The action associated with the cut item 203 is the command Edit Cut in Excel. The properties of this action are displayed in window 201 where they can be modified. In Excel the Edit Cut command is in menu position 1 and has ID 49.

The application menus are duplicated within the designer by retrieving the application menu properties. The operator can access them by simply pressing on the button 202. When the operator chooses a command from the duplicate menu, the application menu name and position and the application item name and id are changed in the properties window 201. If the operator chooses the OK button the new property values are saved with the menu item 203. Any of the other actions described earlier can also be associated with menu items. The results are saved in a menu description file with the same filename as the application in one of the private, group, or public directories.

The menu design facility can automatically create a menu definition for a new application using a definition for another application as a template. All the menu items corresponding to application commands are updated by automatically searching for the correct command IDs using the recursive search described earlier.

Conclusion

Popup menus using images positioned on a regular grid provide an efficient method of controlling and entering data into a computer system. They can be used with existing applications without requiring revision of those applications. They can be created and changed very easily by a relatively unskilled operator. A menu can be requested by the operator at almost any time and with the cursor anywhere on the display and the appropriate menu will be chosen and displayed. If no menu exists for a particular application, a default menu can be updated for the application and displayed so the operator always has a positive response and can use directional gestures with confidence.

Although the description above contains many specificities, these should not be construed as limiting the scope of the invention but as merely providing illustrations of some of the presently preferred embodiments. Various modifications, as well as alternative embodiments of the invention, will become apparent to persons skilled in the art when reading the description of the invention.

For example, with a relative pointing device such as a mouse, the popup menu could always be popped up at a specific position on the screen and the cursor moved to the popup position for the gesture. After selecting an item the cursor could be moved back to its position at the time of the trigger event.

For very advanced operators the time required to display the menu items may slow down the speed of the gesture. In this case, the window for the menu is created, but not displayed. The scanning and confirmation events are tracked as if the window were displayed. Any hesitation in the gesture starts the display of the menu items, so an operator who looses track is presented with a menu after a slight delay. The delay interval is operator adjustable.

It is therefore contemplated that the appended claims will cover any such modifications and embodiments that fall within the true scope of the invention.

I claim:

1. An operator interface apparatus for a computer having a processor, a memory, a display, an input device for controlling the position of a cursor on said display, and a trigger, comprising:

trigger detecting means for detecting an operation of said trigger;

main menu displaying means responsive to said trigger detecting means for displaying a main menu;

defining means for defining a plurality of submenus, each of said submenus having a plurality of language characters arranged thereon, said language characters each composed of a plurality of strokes, and said language characters in each of said submenus having initial strokes written in a similar predetermined direction;

associating means for associating each of said submenus with a cursor gesture matching initial stroke of said language characters in said submenu;

gesture detecting means for detecting a cursor gesture following said operation of said trigger; and submenu displaying means for displaying the submenu associated with the detected cursor gesture.

2. The operator interface of claim 1, further including scrolling means for scrolling one of said submenus when said submenu is partially cut off by an edge of said display, said scrolling means automatically scrolling said submenu away from said edge of said display when said cursor is positioned adjacent said edge of said display.

3. The operator interface of claim 2, further including progressive display means for automatically displaying a plurality of additional language characters from an edge of one of said submenus when said cursor is positioned adjacent said edge.

4. The operator interface of claim 2 wherein said submenus comprise a plurality of three-dimensional-appearing rectangular boxes arranged in three-dimensional cyberspace, whereby said cursor gesture can be made in three-dimensional cyberspace.

5. A operator interface for a computer having a processor, a memory, a display, an input device for controlling the position of a cursor on said display, and a trigger, comprising:

defining means for defining a plurality of menus, each of said menus having a plurality of language characters arranged thereon, said language characters in each of said menus having initial strokes written in a similar predetermined direction;

detecting means for detecting an operation of said trigger;

tracking means for tracking a gesture of said cursor, said gesture comprising a direction of movement of said cursor following said operation of said trigger;

displaying means for displaying a menu having language characters with initial strokes generally matching said gesture;

defining means for defining any language character at the position of said cursor as a current character; and selecting means for selecting said current character.

6. The operator interface of claim 5, further including scrolling means for scrolling one of said menus when said menu is partially cut off by an edge of said display, said scrolling means automatically scrolling said menu away from said edge of said display when said cursor is positioned adjacent said edge of said display.

7. The operator interface of claim 6, further including progressive display means for automatically displaying a plurality of additional language characters from an edge of one of said menus when said cursor is positioned adjacent said edge.

8. The operator interface of claim 6 wherein said menus comprise a plurality of three-dimensional-appearing rectangular boxes arranged in three-dimensional cyberspace, whereby said cursor gesture can be made in three-dimensional cyberspace.

9. An operator interface apparatus for selecting from a plurality of commands in a computer having a processor, a memory, a display, an input device for controlling the position of a cursor on said display, and a trigger operable between an engaged position and a disengaged position, comprising:

trigger event detecting means for detecting a trigger event, said trigger event including a last event comprising an engagement of said trigger;

displaying means responsive to said trigger event detecting means for displaying a menu, said menu having a plurality of menu items arranged in a rectangular array having a plurality of rows and columns, each of said menu items being associated with a different command;

tracking means for tracking said cursor when said cursor is moved across said menu items;

defining means for defining a menu item at the position of said cursor as a current menu item;

highlighting means for highlighting said current menu item;

scrolling means for scrolling said menu if said menu is partially cut off by an edge of said display, said scrolling means automatically scrolling said menu away from said edge of said display when said cursor is positioned adjacent said edge of said display;

trigger disengagement detecting means for detecting a first disengagement of said trigger since said engagement; and activating means responsive to said trigger disengagement detecting means for activating the command associated with said current menu item.

10. An operator interface apparatus for selecting from a plurality of commands in a computer having a processor, a memory, a display, an input device for controlling the position of a cursor on said display, and a trigger operable between an engaged position and a disengaged position, comprising:

trigger event detecting means for detecting a trigger event, said trigger event including a last event comprising an engagement of said trigger;

displaying means responsive to said trigger event detecting means for displaying a menu, said menu having a plurality of menu items arranged in a rectangular array having a plurality of rows and columns, each of said menu items being associated with a different command;

tracking means for tracking said cursor when said cursor is moved across said menu items;

defining means for defining a menu item at the position of said cursor as a current menu item;

highlighting means for highlighting said current menu item;

progressive display means for automatically displaying a plurality of additional menu items from an edge of said menu when said cursor is positioned adjacent said edge;

trigger disengagement detecting means for detecting a first disengagement of said trigger since said engagement; and activating means responsive to said trigger disengagement detecting means for activating the command associated with said current menu item.

11. An operator interface apparatus for selecting from a plurality of commands in a computer having a processor, a memory, a display, an input device for controlling the position of a cursor on said display, a trigger operable between an engaged position and a disengaged position, and a default menu containing application commands common to many different applications, said default menu having a plurality of menu items arranged in a rectangular array having a plurality of rows and columns, each of said menu items being associated with a different command, comprising:

trigger event detecting means for detecting a trigger event, said trigger event including a last event comprising an engagement of said trigger;

command searching means responsive to said trigger event detecting means for automatically searching the currently active application for command identifiers associated with command names in said default menu;

displaying means for displaying said default menu when updated with command identifiers determined by said command searching means;

tracking means for tracking said cursor when said cursor is moved across said menu items;

defining means for defining a menu item at the position of said cursor as a current menu item;

highlighting means for highlighting said current menu item;

trigger disengagement detecting means for detecting a first disengagement of said trigger since said engagement; and activating means responsive to said trigger disengagement detecting means for activating the command associated with said current menu item.

* * * * *